United States Patent [19]
Arai et al.

[11] Patent Number: 5,926,155
[45] Date of Patent: Jul. 20, 1999

[54] DIGITAL VIDEO DISPLAY SYSTEM

[75] Inventors: Ikuya Arai; Kouji Kitou, both of Yokohama, Japan

[73] Assignee: Hitachi, Ltd., Tokyo, Japan

[21] Appl. No.: 08/287,222

[22] Filed: Aug. 8, 1994

Related U.S. Application Data

[63] Continuation of application No. 08/013,810, Feb. 2, 1993, Pat. No. 5,457,473.

[30] Foreign Application Priority Data

Jun. 8, 1993 [JP] Japan .................................... 5-195690

[51] Int. Cl.⁶ ...................................................... G09G 1/02
[52] U.S. Cl. .............................................. 345/10; 345/212
[58] Field of Search .................................... 345/185, 186, 345/199, 10, 112, 113, 507, 11, 132; 395/275, 325, 154; 348/384, 390

[56] References Cited

U.S. PATENT DOCUMENTS

| | | | |
|---|---|---|---|
| 4,626,892 | 12/1986 | Nortrup et al. ............................ | 358/22 |
| 4,684,942 | 8/1987 | Nishi et al. .............................. | 345/199 |
| 4,704,699 | 11/1987 | Farina et al. ......................... | 345/199 X |
| 4,731,602 | 3/1988 | Yoneda et al. ........................... | 345/112 |
| 4,884,972 | 12/1989 | Gasper ..................................... | 395/154 |
| 5,140,312 | 8/1992 | Ishii ..................................... | 345/199 X |
| 5,164,819 | 11/1992 | Music ................................. | 345/202 X |
| 5,276,458 | 1/1994 | Sawdon .................................... | 345/132 |
| 5,446,482 | 8/1995 | Van Aken et al. ...................... | 345/199 |
| 5,457,473 | 10/1995 | Arai et al. ................................. | 345/10 |
| 5,602,567 | 2/1997 | Kanno .................................... | 345/507 |
| 5,644,513 | 7/1997 | Rudin et al. ............................ | 364/572 |

*Primary Examiner*—Amare Mengistu
*Attorney, Agent, or Firm*—Antonelli, Terry, Stout & Kraus, LLP

[57] ABSTRACT

A digital video display system which includes a digital data output unit, such as a computer system, and a display unit coupled to receive digital data from the digital data output unit. In order to reduce the amount of data transferred on a signal line connecting the digital data output unit and the display unit, the digital data is transferred as a video drawing command. After the display unit receives this video drawing command, a drawing processing circuit within the display unit generates digital video data and a synchronizing signal based on the video drawing command. This digital video data is then stored, and subsequently converted to an analog video signal for display. Alternative embodiments are also provided which include audio processing, arrangements for simultaneously displaying multiple pictures, and arrangements for compression and decompression of the video data.

27 Claims, 13 Drawing Sheets

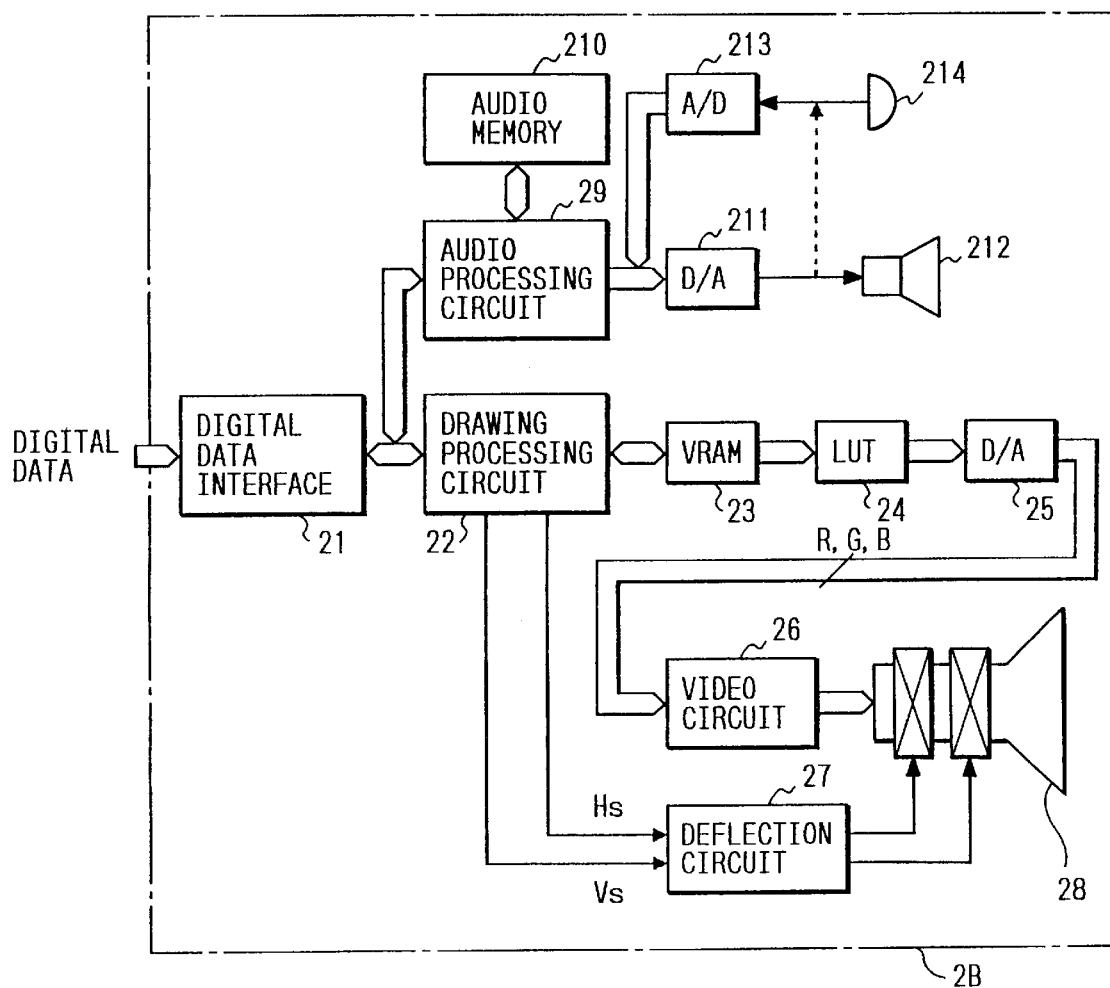

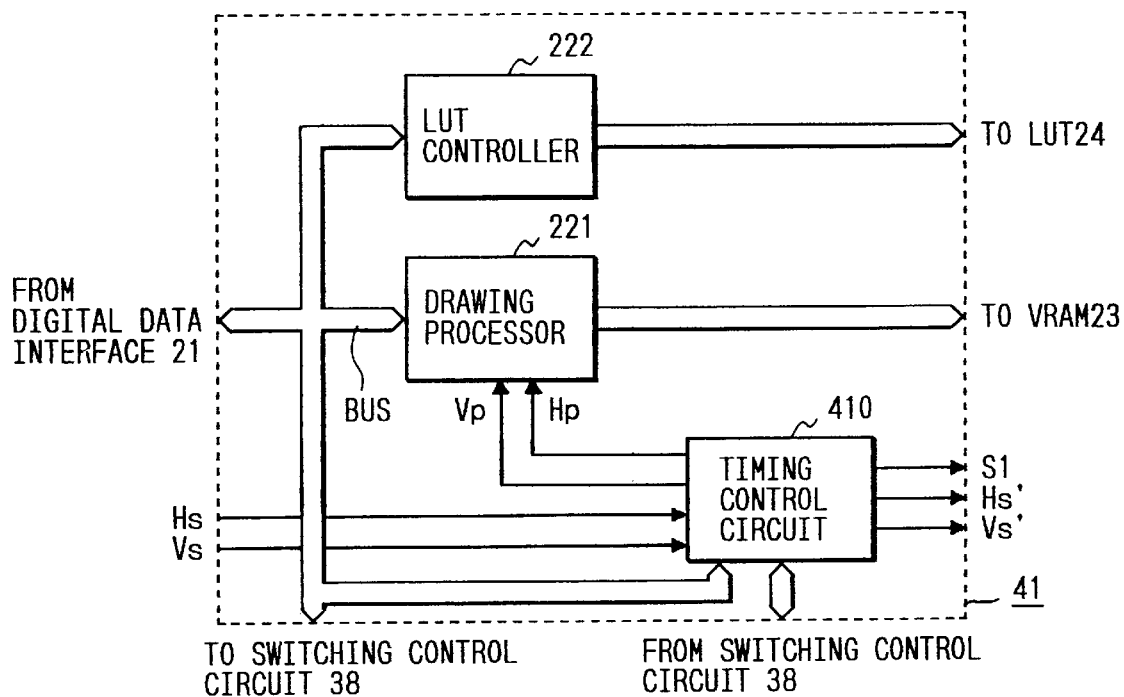
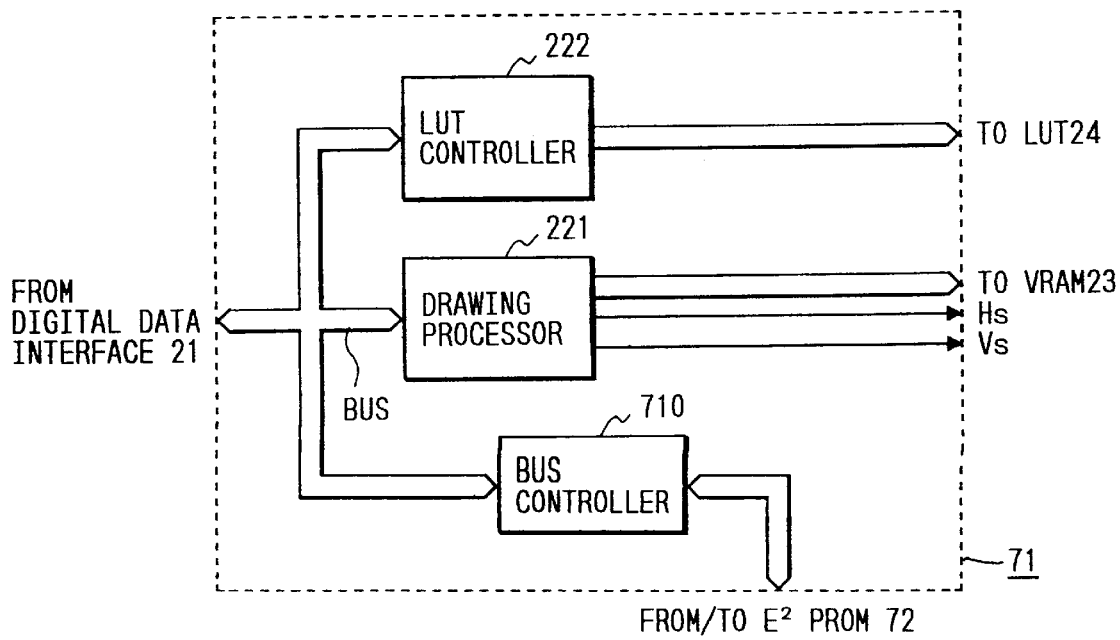

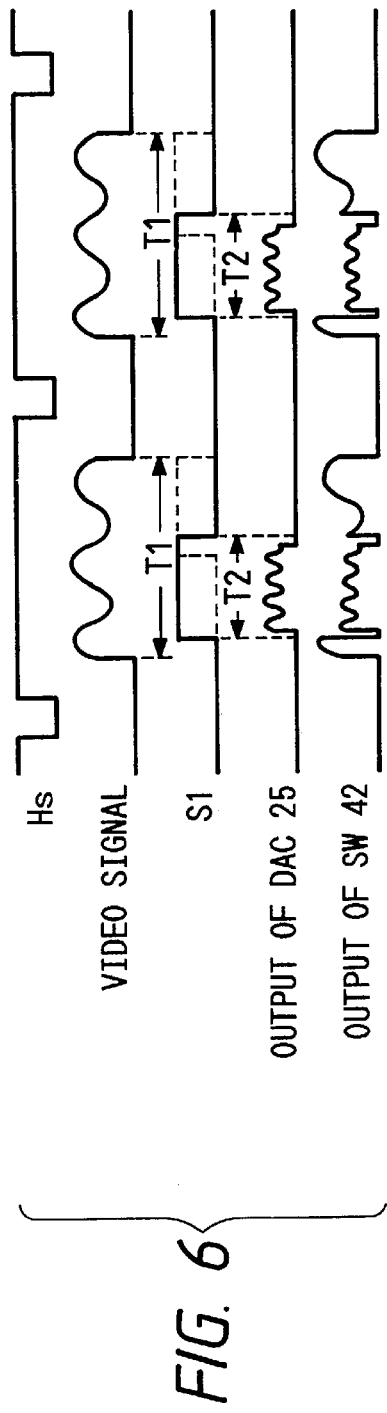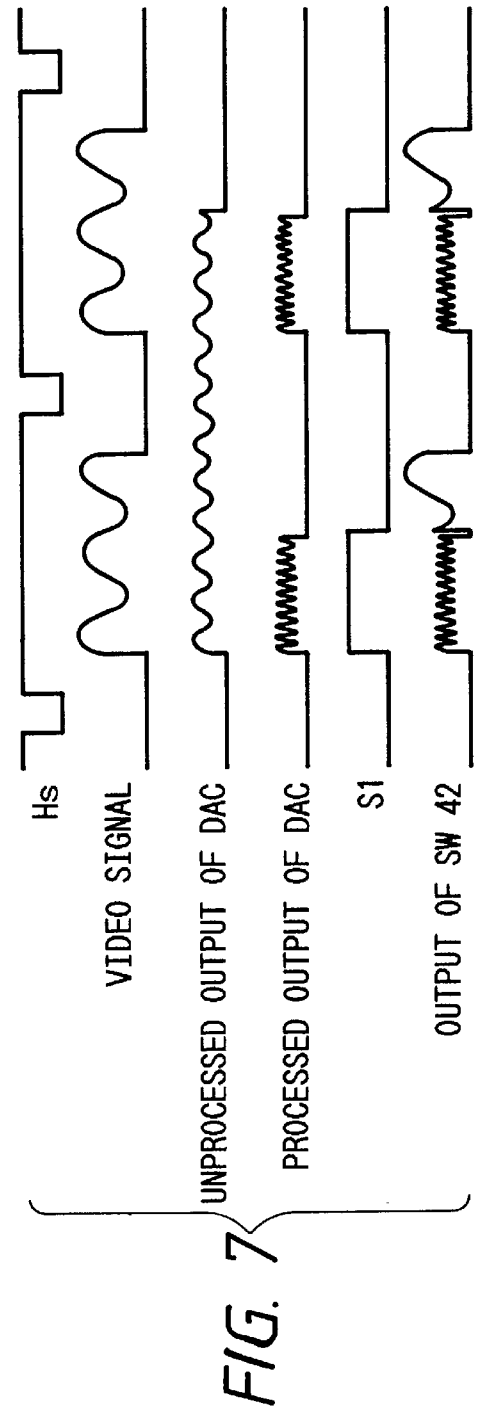

DIGITAL VIDEO DISPLAY SYSTEM

CROSS REFERENCE TO RELATED APPLICATIONS

This application is a continuation-in-part of U.S. patent application Ser. No. 13,810, filed Feb. 2, 1993, now U.S. Pat. No. 5,457,473.

FIELD OF THE INVENTION

The present invention relates to a digital video display system comprising a digital date output unit, such as a computer, and a display unit for displaying pictures sent from the digital data output unit.

BACKGROUND OF THE INVENTION

Today, most of the display units used on computer terminals and the like output analog RGB video signals to a color display terminal. In keeping with the recent trend toward higher levels of display resolution, the display units utilize a horizontal deflection frequency of 90 kHz and a video signal bandwidth of about 150 MHz. This often leads to such problems as signal losses and unwanted radiated emission during transmission of the video signals from the computer proper to a display unit located away from it.

Conventional attempts to solve the above problems illustratively involve having the computer transmit low-frequency digital video data unmodified (i.e., without converting the video signals to analog signals) to the display unit.

One conventional technique of the above kind is disclosed in Japanese Patent Laid-Open No. 233779/1986. The disclosed technique involves retrieving digital video data from the video memory of the computer and outputting the data in parallel signal format to the display unit. In turn, the display unit converts the received data from digital to analog format. The resulting analog video signals are used to provide a video display.

The standard resolution for the grade of ordinary personal computer displays is illustratively 640 by 480 dots (640 horizontal dots and 480 vertical lines). Suppose that the RGB video signals are given eight-bit gradation each (i.e., 16.67 million color options per dot). In that case, the required rate of digital video data transfer from the computer to the display unit receives the drawing commands and audio commands, and is as high as 55 megabytes per second. The high resolution for the grade of workstation displays is illustratively 1280 by 1024 dots. With 256 color options assigned per dot, the necessary rate of digital video data transfer is about 80 megabytes per second. Today's trend is for the level of resolution to go up further. The number of color options per dot is approaching 16.67 million, so that the resolution is almost high enough to permit display of natural pictures on the display unit.

As described, where it is desired to have the display unit display pictures sent from the computer, the amount of digital video data to be transferred from the computer to the display unit is enormous. If the conventional technique outlined above is used to transmit digital video data in eight-bit parallel format, a data transfer clock frequency of about 55 MHz is needed for the standard resolution and about 80 MHz for the high resolution. One result of this is the diminished effectiveness in reducing the unwanted radiated emission. In practice, with the data transfer rate as high as is conventionally proposed, it is difficult to implement data transfer setups of adequate reliability free of dropped bits or noise intrusions. Furthermore, when the width of data to be transmitted is raised from eight bits to 16, 32, etc., the data transfer clock rate may be lowered but more and more cables are needed to perform digital video data transfer. Since the bulky cables are cumbersome to handle around equipment, it becomes increasingly impractical to locate the computer proper far away from the display unit.

SUMMARY OF THE INVENTION

It is therefore an object of the present invention to provide a digital video display system that requires only limited quantities of data to be transmitted from a computer or the like to a display unit for video display.

Another object of the invention is to provide a digital video display system that permits the display unit to enhance its functions through its own digital signal processing.

In carrying out the invention, there is provided a digital video display system comprising a computer and a display unit; the computer having interface means for outputting a video drawing command; the display unit including interface means for receiving the video drawing command, drawing processing means, video memory means, and video digital-analog conversion means.

In a preferred structure according to the invention, the display unit includes audio processing means, audio memory means, audio digital-analog conversion means, a speaker, a microphone, and audio analog-digital conversion means.

In another preferred structure according to the invention, the display unit includes preprocessing means, clock generation means, video analog-digital conversion means, digital interface means, drawing processing means, switching control means, video memory means, and video digital-analog conversion means.

In a further preferred structure according to the invention, the display unit includes digital interface means, switching control means, drawing processing means, video memory means, video digital-analog conversion means, analog video signal input means, and video switching means.

In a yet further preferred structure according to the invention, the display unit additionally includes sensor means, analog-digital conversion means, operation control means, and characteristic memory means for retaining characteristic data.

In a still further preferred structure according to the invention, the computer includes drawing processing means, data compression means, and digital interface means, while the display unit comprises digital interface means, data decompression means, memory means, and video digital-analog conversion means.

In another preferred structure according to the invention, the computer includes drawing processing means, video memory means, data compression means, and digital interface means, while the display unit comprises digital interface means, data decompression means, and video digital-analog conversion means.

In a further preferred structure according to the invention, the display unit includes input unit interface means for use with an input unit.

In operation, the invention work as follows: the digital interface means of the computer outputs video drawing commands and audio command signals to the display unit, while the digital interface means of the display unit receives the drawing command and audio commands, and sends control commands, operation status, audio files and display characteristic data to the computer. Given the video drawing command, the drawing processing means generates video data for the video display. The video memory means retains one screen of the video data generated by the drawing processing means. The video digital-analog conversion means converts the video data read from the video memory means into an analog video signal.

The audio processing means generates audio data from the audio command signal sent from the digital interface means, or turns the audio data conversely into audio commands and audio files for output to the digital interface means. The audio memory means temporarily accommodates the audio data generated by the audio processing means. The audio digital-analog conversion means converts audio data to an audio signal for reproduction via the speaker. The audio analog-digital conversion means converts the sound admitted through the microphone into audio data.

The preprocessing means clamps the analog video signal entered into the display unit and extracts a synchronizing signal from that signal. The clock generation means generates a sampling clock signal in phase synchronism with that synchronizing signal. The video analog-digital conversion means converts the video signal to digital format in accordance with the sampling clock signal. The drawing processing means generates video data from the video drawing command signal, switches the video data and the digital video signal as needed for selective display, and carries out a superimposing operation involving the two kinds of signals. The switching control means causes the drawing processing means to control the switching of video processing modes.

In addition, the drawing processing means generates video data of various levels of resolution. The video switching means switches two video signals: one being the signal from the analog video signal input means, the other being the signal based on the video data generated by the drawing processing means. For the switching operation, the switching control means controls the resolution of the video data generated by the drawing processing means and also causes the drawing processing means to control the video switching means.

The sensor means detects the display characteristic of the display units. The analog-digital conversion means digitizes the values presented thereto. Given the digital values, the operation control means generates characteristic data for the display unit through operations, and controls the characteristic memory means. The characteristic memory means retains characteristic data.

The data compression means compresses the video data generated by the drawing processing means for data quantity reduction. The data decompression means decompresses the compressed video data back to the initial data.

The input unit interface means takes control commands into the display unit from the input unit, such as a keyboard, a mouse, a touch panel or a pen input tablet. The digital interface means converts the control command thus admitted to a format fit for transmission to the computer.

The invention makes it possible to transmit digital video data for high resolution display from the computer to the display unit(s) at a transfer rate fit for commonly used digital interfaces. Compared with conventional setups for transmitting analog video signals, the system of the invention ensures reduced line losses, less noise intrusion, and lowered unwanted radiation noise caused by the high-frequency component of the signal transmitted. Because the system of the invention allows the computer to be located away from the display unit without adverse effects, the system is laid out much more flexibly than conventional systems. With data transmitted in the digital signal format, not only video signals but also audio signals and display control information may be transmitted over the same transmission line from the computer to the display unit. In the reverse direction of data flow, the display unit can also transmit its internal information to the computer. In carrying out its drawing process, the display unit may superimpose one picture based on one input video signal onto another picture derived from another input video signal. These features combine to provide various benefits, such as boosting the functionality of the system and expanding the scope of system availability.

BRIEF DESCRIPTION OF THE DRAWINGS

These and other objects, features and advantages of the present invention will become more readily apparent from the following detailed description and claims when taken in conjunction with the accompanying drawing wherein:

FIG. 3 is a block diagram of another embodiment of the invention;

FIG. 5A is a block diagram of a drawing processing circuit which can be used in the embodiment of FIG. 5.

FIG. 6 is a timing chart in effect when the embodiment of FIG. 5 operates;

FIG. 7 is another timing chart in effect when the embodiment of FIG. 5 operates;

FIG. 8A is a block diagram of a drawing processing circuit which can be used in the embodiment of FIG. 8.

DETAILED DESCRIPTION OF THE DRAWINGS

Preferred embodiments of the invention will now be described with reference to the accompanying drawings.

Figure 1:
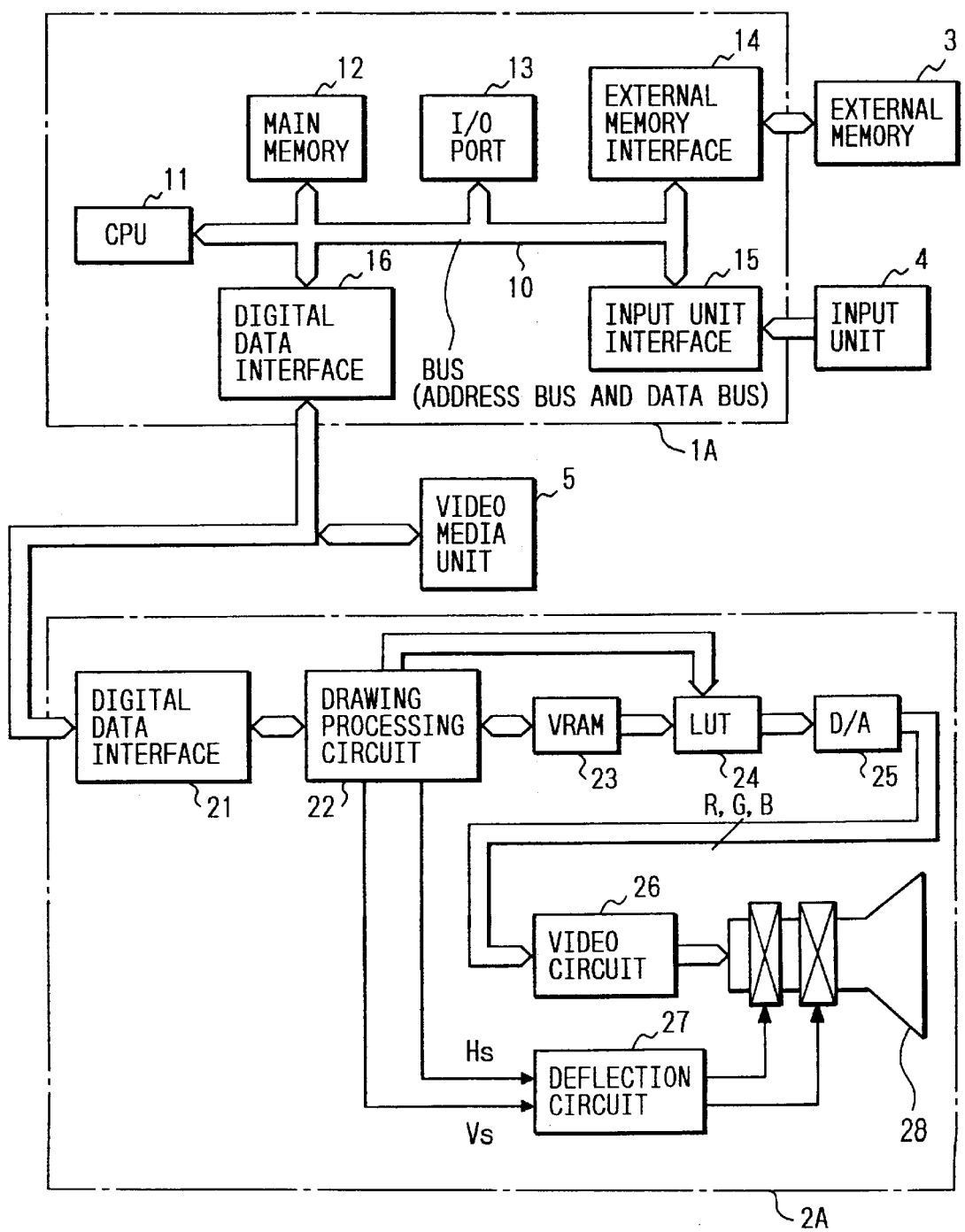
FIG. 1 is a block diagram of a first embodiment of the invention.

FIG. 1 is a block diagram of a first embodiment of the invention. In FIG. 1, a portion 1A enclosed by a dashed line indicates a computer proper. In the portion 1A, reference numeral 11 is a central processing unit (CPU); 12 is a main memory; 13 is an input/output port that connects the computer 1A to such peripheral devices as a printer and a modem; 14 is an external memory interface for exchanging data with an external memory 3, to be described later; 15 is an input unit interface through which input control commands are provided from an input unit 4, to be described later; and 16 is a digital data interface that forwards to a display unit the video drawing command sent as digital data over a bus 10.

Another portion 2A enclosed by a dashed line represents the display unit. In the portion 2A, reference number 21 is a digital data interface that receives the video drawing command sent as digital data from the computer 1A; 22 is a drawing processing circuit that generates for video display the digital video data from the video drawing command received by the digital data interface 21; 23 is a video memory (VRAM) for retaining the digital video data generated by the drawing processing circuit 22; 24 is a look-up table (LUT); 25 is a digital-analog converter (DAC); 26 is a video circuit; 27 is a deflection circuit; and 28 is a color display tube (CDT).

Also in FIG. 1, reference numeral 3 is an external memory that uses a storage medium different from that of the main memory 12. The external memory 3 may be a floppy disc drive, a hard disc drive, a magneto-optical disc drive, a magnetic tape unit, etc. Reference numeral 4 is an input unit such as the keyboard, mouse, pen input tablet or touch panel, etc. Reference numeral 5 is a digital video media unit connectable to the digital data interfaces 16 and 21. The unit 5 may be a CD-ROM drive handling digital video data, a magneto-optical disc drive, a scanner, an electronic still camera, a digital VTR, or a camcorder capable of handling digital video data, etc.

The embodiment of FIG. 1 works as follows: the computer 1A is a computer proper, equivalent in constitution to commonly used personal computers or workstations. The computer 1A is generally connected to a bus 10 and is equipped with the digital data interface 16 in place of a video graphic circuit for generating analog RGB video signals. When a control command is received from the external memory 3 such as a floppy disc drive or from the input unit 4 such as a keyboard, the control command is input to the CPU 11 via the external memory interface 14 or the input unit interface 15 and the bus 10. In response to the control command, the CPU 11 generates a video drawing command. The video drawing command is transmitted as digital data to the display unit 2A through the digital data interface 16.

The display unit 2A receives the transmitted video drawing command via the digital data interface 21. The drawing processing circuit 22 interprets the received video drawing command and generates digital video data accordingly. At the same time, the drawing processing circuit 22 generates synchronizing signals (Hs, Vs) that drive the deflection circuit. The digital video data thus generated is stored consecutively into the VRAM 23 and later read therefrom for video display. Thus, the VRAM 23 is a two-port type memory having input and output ports separately. The LUT 24 comprises a translation table for translating the digital video data read from the VRAM 23 into digital video data having color signal amplitude information to be actually displayed. After translation, the digital video data having the color signal amplitude information is sent to the DAC 25. The DAC 25 converts the received digital video data into analog RGB video signals, i.e., into the input video signal format fit for ordinary display units. The contents of the translation table in the LUT 24 may be rewritten using a rewrite signal issued by the drawing processing circuit 22, so that the colors displayed on the screen of the CDT 28 may be changed as desired.

The LUT 24 may also be omitted from the system, if desired. In that case, the contents of the VRAM 23 correspond on a one-to-one basis to the signal amplitude information of each of the RGB colors. After conversion, the analog RGB video signals enter the CDT 28 via the video circuit 26. The synchronizing signals generated by the drawing processing circuit 22 are also entered into the CDT 28 through the deflection circuit 27. This provides a video display similar to that of commonly used display units.

Figure 1A:
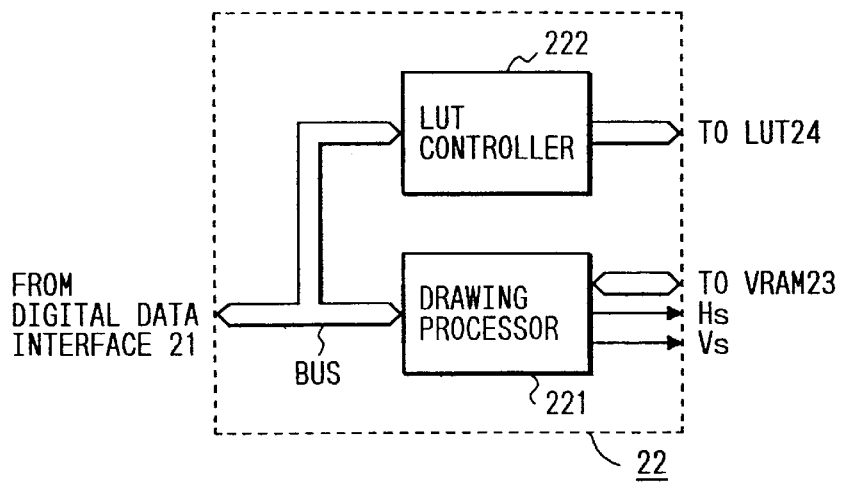
FIG. 1A is a block diagram of a drawing processing circuit which can be utilized in the embodiment of FIG. 1.

FIG. 1A depicts a preferred embodiment of drawing processor circuit 22. The video drawing commands from digital data interface 21 are applied to drawing processor 221, which can be a conventional drawing processor such as a Hitachi HD63484, an Intel i82786, or a Texas Instruments TMS34010. Drawing processor 221 provides digital video data to VRAM 23 and synchronizing signals Hs, Vs to deflection circuit 27. Commands to rewrite the contents of LUT 24 which are received from digital data interface 21 are sent to LUT controller 222 which provides the signals to rewrite the contents of the LUT.

As described, this embodiment transmits desired pictures from the computer 1A to the display unit 2A in the form of a video drawing command composed of digital data rather than in the conventional form of analog video signals or of digital video data converted from the analog video signal. This embodiment thus reduces the amount of data to be transmitted from the computer to the display unit for video display.

Below is a description, with reference to FIGS. 2A and 2B, of the difference between two modes of operation in terms of quantities of data to be transmitted. One mode is a mode in which a desired picture is transmitted as a video drawing command, in accordance with the present invention. The other mode is a mode in which the picture is transmitted as digital video data similar to arrangements used in the prior art. In other words, FIG. 2A shows the mode in which the desired picture is transmitted as a video drawing command, and FIG. 2B indicates the mode in which the picture is transmitted as digital video data.

Suppose that the display unit 2A has 640 by 480 dots of display resolution (640 horizontal dots and 480 vertical lines) and that the picture of, say, a horizontal line is to be displayed along the top display line. As shown in FIG. 2A, where the picture is transmitted as the video drawing command, for instance, the computer 1A transmits the command "LINE(0,0)–(0,640)" (for drawing a line along the top display line) as digital data to the display unit 2A. Inside the display unit 2A, the command is turned into the digital video data for video display on the screen. Basically, the computer 1A need only transmit a simple video drawing command "LINE(0,0)–(0,640)" to the display unit 2A in the form of digital data. This means a considerable reduction in the amount of data to be transmitted.

Figure 2A:
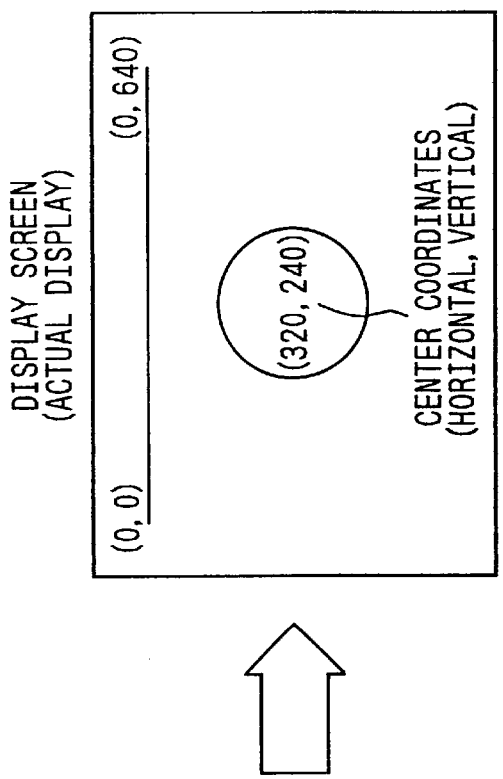
FIG. 2A is diagram illustrating the mode in which a desired picture is transmitted as a video drawing command.
Figure 2B:
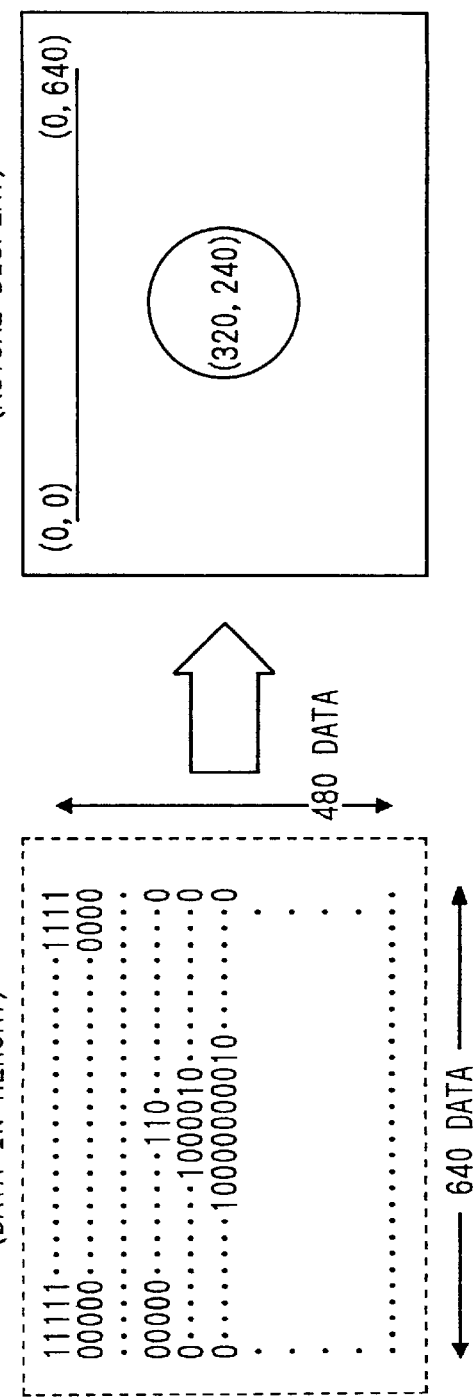
FIG. 2B is a diagram illustrating the mode in which the picture is transmitted as digital video data.

On the other hand, suppose that the computer 1A transmits the picture as digital video data to the display unit 2A as shown in FIG. 2B in accordance with conventional techniques. In that case, 640 pieces of data "1111 . . . 11111" (a 1 being a data item designating screen display) representing the line along the top display line are first transmitted from the computer 1A to the display unit 2A, followed by the data denoting the remaining number of lines (479 lines), the whole of the data items being displayed on the display unit 2A as the data are sent in on the display unit 2A. That is, transmitting the picture as digital video data requires the target data to correspond on a one-to-one basis to the display screen. Basically, that means the need to transmit from the computer 1A to the display unit 2A as many as 640 by 480 pieces of data, which is a huge amount of data.

As also depicted in FIG. 2A, when the computer 1A transmits the command "CIRCLE(320,240,50)" as digital data to display unit 2A, drawing processing circuit 22 turns the command into the digital video data to display on CDT 28 a circle having its center at horizontal dot 320 of vertical line 240 with a diameter of 50 dots. In comparison, if computer 1A transmits the picture as digital video data, pieces of data for each pixel on the VDT display must be transmitted, as shown in FIG. 2B.

Because this embodiment transmits desired pictures in the form of video drawing commands from the computer to the display unit as described, the amount of data to be transmitted is reduced appreciably. This translates into lower signal frequencies and reduced unwanted radiated emission over the transmission line, and less likelihood of dropped bits and noise intrusions. Furthermore, there is no need to increase the number of cables to be installed between the configured devices.

LUT 24 is conventional, for example, it may be mounted on an LSI made by Brook Tree, Inc., Texas Instruments or Analog Devices, Inc.

The digital data interfaces 16 and 21 may be proprietary. Alternatively, each of these interfaces may be a general-purpose parallel interface such as the SCSI interface, printer interface or GP-IB interface, or a general-purpose serial interfaces such as a network interface or RS-232C interface, or RS-422 interface. The use of general-purpose interfaces expands the scope to which the invention may be adapted. Illustratively, if SCSI interfaces are incorporated, they may be connected to the digital video media unit 5, which may be a multimedia video apparatus such as a CD-ROM or which may be a video input unit such as a scanner. The display unit 2A may admit digital video data from the digital video media unit 5 for direct display thereon. For these purposes, the drawing processing circuit 22 in the display unit 2A has special functions to communicate with the digital video media unit 5 via the digital data interface 21 to verify what kind of data the connected digital video media unit 5 provides. With the format of the digital video data from the unit 5 thus verified, these functions of the drawing processing circuit 22 perform drawing processing in compliance with that format.

This embodiment, when connected directly to the digital video media unit 5 is capable of reproducing various video media, and thus, displays pictures on the display unit 2A without intervention by the computer 1A.

This embodiment has its digital data interfaces 16 and 21 interconnected using a bidirectional bus. This means that when the operation status of the drawing processing circuit 22, VRAM 23 or LUT 24 is detected in the display unit 2A, the result may be transmitted in the form of a command to the computer 1A via the digital data interfaces 16 and 21. Transmissions of this kind permit the operation of the display unit to be checked upon power-up or during adjustment at the factory.

FIG. 3 is a block diagram of another embodiment of the invention. In FIG. 3, a portion 2B enclosed by dashed line represents a display unit. In the portion 2B, reference numeral 29 is an audio processing circuit; 210 is an audio memory circuit; 211 is a DAC that converts digital audio data into an analog audio signal; 212 is a speaker; 213 is an analog-digital converter (ADC); and 214 is a microphone. The reference numerals identical to those in FIG. 1 denote the same or corresponding components.

This embodiment of FIG. 3 works as follows: as shown in FIG. 3, the display unit 2B receives a video drawing command and an audio processing command transmitted as digital data from the computer 1A or from the digital video media unit 5 (see FIG. 1) over the same transmission line. The transmitted digital data is received by the digital data interface 21. As with the display unit 2A of FIG. 1, the circuitry comprising the drawing processing circuit 22, VRAM 23, LUT 24 and DAC 25 turns the video drawing command into an analog video signal. The audio processing command is demodulated by the audio processing circuit 29 back to the actual audio signal which is retained in the audio memory 210 as digital audio data to which an analog audio signal is merely converted. From the audio memory 210, the digital audio da is retrieved and is converted by the DAC 211 into an analog audio signal. The speaker 212 reproduces the analog audio signal as sound output.

As described, this embodiment transmits video and audio data as the video drawing and audio processing commands through the same interface. This eliminates the need to install more cables. Where an application program handling both video and audio data is run on the computer 1A, the computer 1A may be connected to the display unit 2B of this embodiment which readily provides video display and audio output without the need for additional circuits.

This embodiment may admit sound from the microphone 214, convert it into digital audio data through the ADC 213, modulate the data through the audio processing circuit 29, and transmit the modulated data via the digital data interface 21 to the computer 1A for use as audio data. The speaker 212 may double as the audio input unit replacing the microphone 214. In this case, the sound input through the speaker 212 enters the ADC 213, as indicated by broken line in FIG. 3, to go through the above-described processing.

Audio processing circuit 29, audio memory 210, DAC 211, speaker 212, ADC 213, and microphone 214 are conventional parts of an audio board of a personal computer.

Figure 4A:
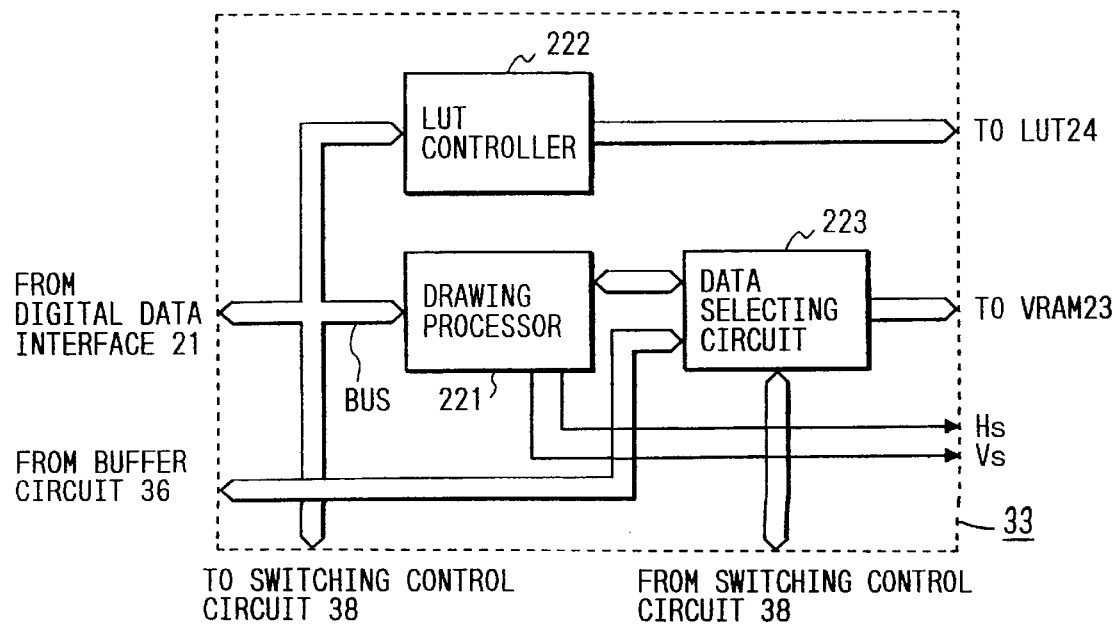
FIG. 4A is a block diagram of a drawing processing circuit which can be used in the embodiment of FIG. 4.
Figure 4:
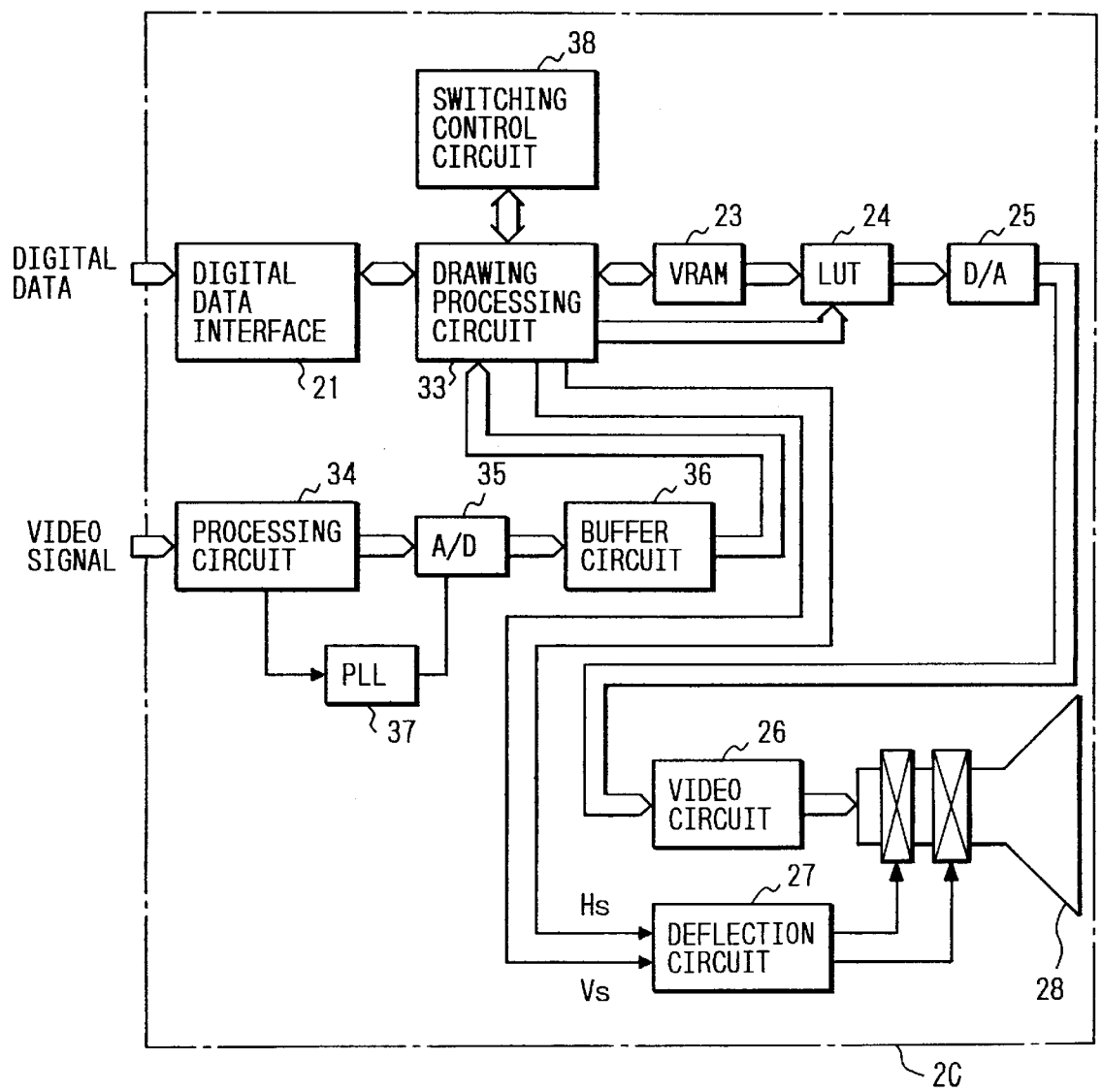
FIG. 4 is a block diagram of still another embodiment of the invention.

FIG. 4 is a block diagram of another embodiment of the invention. In FIG. 4, a portion 2C enclosed by a dashed line represents a display unit. In the portion 2C, reference numeral 33 is a drawing processing circuit different from the drawing circuit 22 of FIGS. 1 and 3; 34 is a preprocessing circuit; 35 is an ADC; 36 is a buffer circuit; 37 is a phase-locked loop (PLL) circuit; and 38 is a signal switching circuit. The reference numerals identical to those in FIGS. 1 and 3 represent the same or corresponding components.

This embodiment of FIG. 4 works as follows: as shown in FIG. 4, the display unit 2C receives a video drawing command as digital data from the computer 1A (FIG. 1) as well as analog video signals (which can simply be called video signals) from another ordinary computer or from such video output units as a VCR or a laser disk (LD) player. The video drawing command transmitted as digital data is received through the digital data interface 21. Digital video data is generated on the basis of the video drawing command thus received.

The received analog video signal enters the preprocessing circuit 34 to undergo a video clamping process or, if the signal is of a composite type, to go through the process of synchronizing signal extraction from the video signal. After the processing, the ADC 35 converts the analog video signal into digital video data. The sampling clock signal used by the ADC 35 is generated by the PLL circuit 37. The sampling clock signal thus generated is arranged to synchronize with the synchronizing signal output by the preprocessing circuit 34. The digital video data after conversion passes through the buffer circuit 36 to go consecutively into the drawing processing circuit 33.

From a user outside the display unit 2C, the switching control circuit 38 receives directions as to what kind of video processing is to be performed. The switching control circuit 38 also receives a switching control command from the computer 1A via the digital data interface 21 and the drawing processing circuit 33. Given these directions or the command, the switching control circuit 38 interprets them and gives appropriate orders to the drawing processing circuit 33. On receiving such orders from the switching control circuit 38, the drawing processing circuit 33 switches two kinds of digital video data for selective output, one kind of digital video data being the data generated as per the video drawing command, the other kind of digital video data being the data obtained through conversion of the analog video signal. The drawing processing circuit 33 also performs necessary video processing on the data being output. According to the switching and the video processing, the picture based on the video drawing command or that based on the analog video signal is displayed on the CDT 28 in one of several optional modes. In one mode, one of the two pictures is displayed on the screen of the CDT 28 in which a window is included to show the other picture therein. In another mode, one picture is superimposed on the other when displayed on the CDT 28. In yet another mode, the display of the above modes is enlarged, contracted, or scrolled as desired. The digital video data thus switched or processed by the drawing processing circuit 33 is later written to the VRAM 23. Subsequent circuit operations are the same as those of the embodiment of FIG. 1.

FIG. 4A depicts a preferred embodiment of drawing processing circuit 33. The reference numerals identical with FIG. 1 represents the same or corresponding components. Data selecting circuit 223 switches between digital video data from drawing processor 221 and digital video data from buffer 36 according to instructions from switching control circuit 38.

This embodiment transmits not only the video drawing command but also the ordinary analog video signal to the display unit 2C for selective display thereon. Furthermore, this embodiment is capable of displaying concurrently the two kinds of pictures in various display modes.

Figure 5:
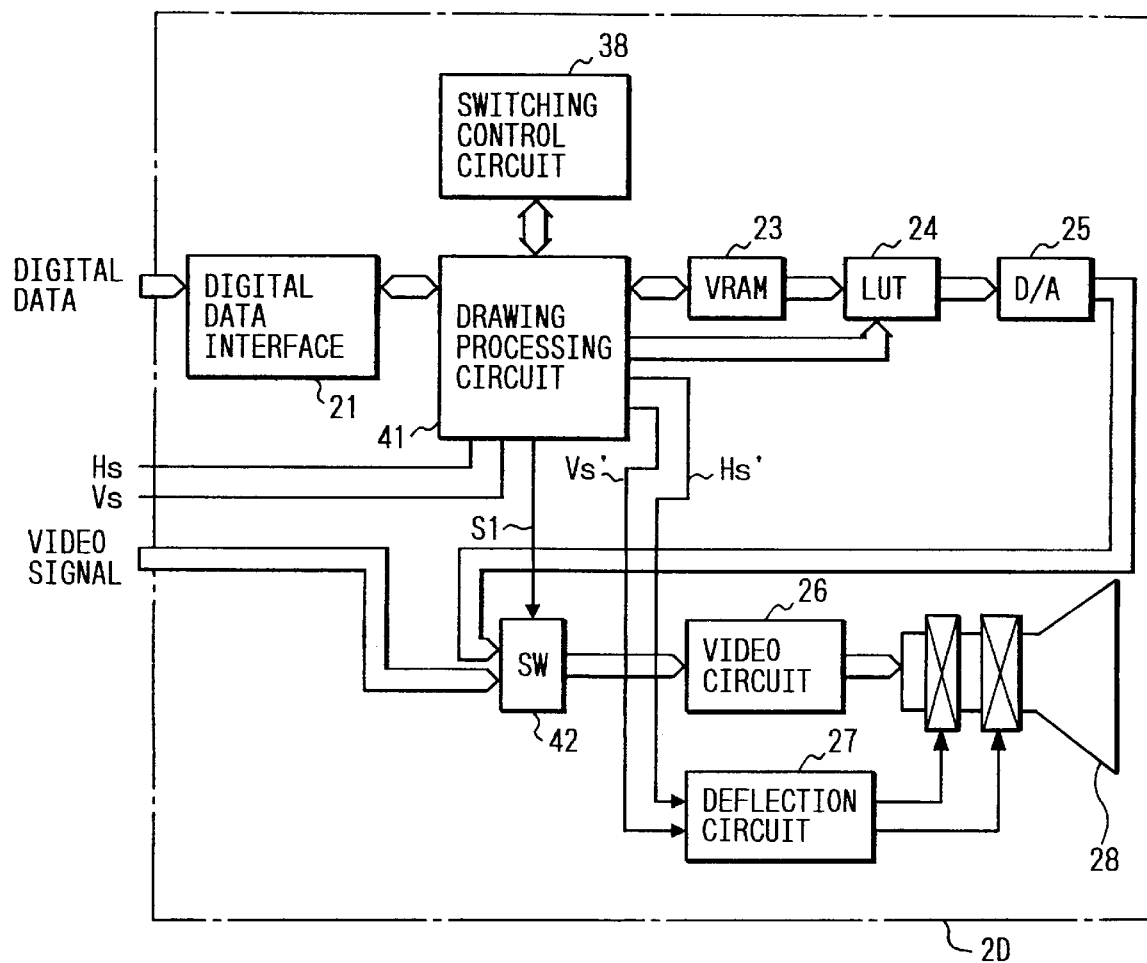
FIG. 5 is a block diagram of a further embodiment of the invention.

FIG. 5 is a block diagram of yet another embodiment of the invention. In FIG. 5, a portion 2D enclosed by a dashed line is a display unit. In the portion 2D, reference numeral 41 is a drawing processing circuit different from the drawing processing circuits of FIGS. 1 and 4, and reference numeral 42 is an analog signal switching circuit. The reference numerals identical to those in FIGS. 1, 3 and 4 denote the same or corresponding components.

This embodiment of FIG. 5 works as follows: as shown in FIG. 5, the display unit 2D receives a video drawing command as digital data from the computer 1A (FIG. 1) as well as analog video signals from another ordinary computer or from such video output units as a VCR or an LD player. This arrangement is the same as that in FIG. 4. Inside the display unit 2D, the analog video signal directly enters the analog signal switching circuit 42 since there is no digital processing to be performed. The video drawing command is converted to an analog video signal by the drawing processing circuit 41, VRAM 23, LUT 24 and DAC 25. After conversion, the analog video signal enters the analog signal switching circuit 42.

The drawing processing circuit 41 receives orders from the switching control circuit 38 that is similar to that of FIG. 4 and accordingly selects one of two pictures for display on the CDT 28. One of the two pictures is the picture based on the video drawing command, the other the picture based on the analog video signal. In accordance with the picture selected, the drawing processing circuit 41 controls the analog signal switching circuit 42 in the following manner.

In a first display control mode, the display unit 2D displays on the CDT 28 either the picture based on the video drawing command transmitted to the display unit 2D, or the picture based on the analog video signal. At this point, if the picture based on the analog video signal is selected, the synchronizing signals Hs and Vs that entered the display unit 2D along with the video signal go first to the drawing processing circuit 41 and then go unchanged to the deflection circuit 27. It follows that the synchronizing signals Hs and Vs are identical to synchronizing signals Hs' and Vs' output by the drawing processing circuit 41. On the other hand, if the picture based on the video drawing command is selected, the synchronizing signals Hs' and Vs' are synchronous with synchronizing signals generated at intervals fit for video display.

In a second display control mode, the display unit 2D displays the picture based on the analog video signal which includes a window in which to display the picture based on the video drawing command. At this point, the input and the output synchronizing signals of the drawing processing circuit 41 are the same. If the picture based on the analog video signal has a display resolution sufficiently higher than that of the picture based on the video drawing command, the drawing control circuit 41 generates digital video data in synchronism with the synchronizing signals Hs and Vs and in accordance with the video drawing command. Later, all digital video data is read with appropriate timing from the VRAM 23 for conversion to analog format through the LUT 24 and DAC 25. The analog signal switching circuit 42 switches the analog video signal thus obtained and the video signal with appropriate timing. This causes the picture based on the video drawing command to appear in a display area within the picture based on the analog video signal on the display unit.

FIG. 5A depicts a preferred embodiment of drawing processing circuit 41. The reference numerals identical with FIG. 1A represent the same or corresponding components. Timing control circuit 410 provides control signal S1 to switching circuit 42 and timing signals Hp and Vp to drawing processor 221, as well as synchronization signals Hs' and Vs'.

FIG. 6 is a timing chart in effect when the embodiment of FIG. 5 operates in this manner. Given the horizontal synchronizing signal Hs of the analog video signal, the display period of that video signal is a period T1 as shown in FIG. 6. A control signal S1 generated by the drawing processing circuit 41 causes the analog signal switching circuit 42 to select the analog video signal output by the DAC 25 in a period T2 which is shorter than the period T1. In the remaining periods, the analog video signal is selected. As a result, the analog signal switching circuit 42 switches its outputs as shown in FIG. 6 for window display in the horizontal direction. The window display position is varied by shifting the time at which to start reading the horizontal synchronizing signal Hs for the digital video data read from the VRAM 23 under control of the switching control circuit 38. This causes the control signal Si from the drawing processing circuit 41 to move as indicated by the broken line in FIG. 6, thus varying the window display position. The same process is also carried out in the vertical direction.

FIG. 7 is another timing chart in effect when the embodiment of FIG. 5 operates with an analog video signal having a display resolution equal to or lower than that of the picture based on the video drawing command. An attempt by the drawing processing circuit 41 to read all digital video data from the VRAM 23 in synchronism with the synchronizing signal Hs would cause the video signal to exceed one horizontal period of the synchronizing signal HS, as in the case of the unprocessed output of the DAC 25 shown in FIG. 7. Since the resolution of a video signal is different from that of a digital video signal, it is impossible to read all the data stored in one cycle of the horizontal synchronization signal Hs. This problem is circumvented by reading the video data from the VRAM 23 in a thinning-out fashion, as shown in FIG. 7 for the case of the output of the DAC 25. The drawing processing circuit 41 generates the control signal S1 for control of the analog signal switching circuit 42 so that the video signal will fall well within the single horizontal period. The same process is carried out in the vertical direction.

In the manners described above, the display unit 2D of FIG. 5 switches two video signals and causes a window display to appear on the screen of the CDT 28 as desired.

Figure 8:
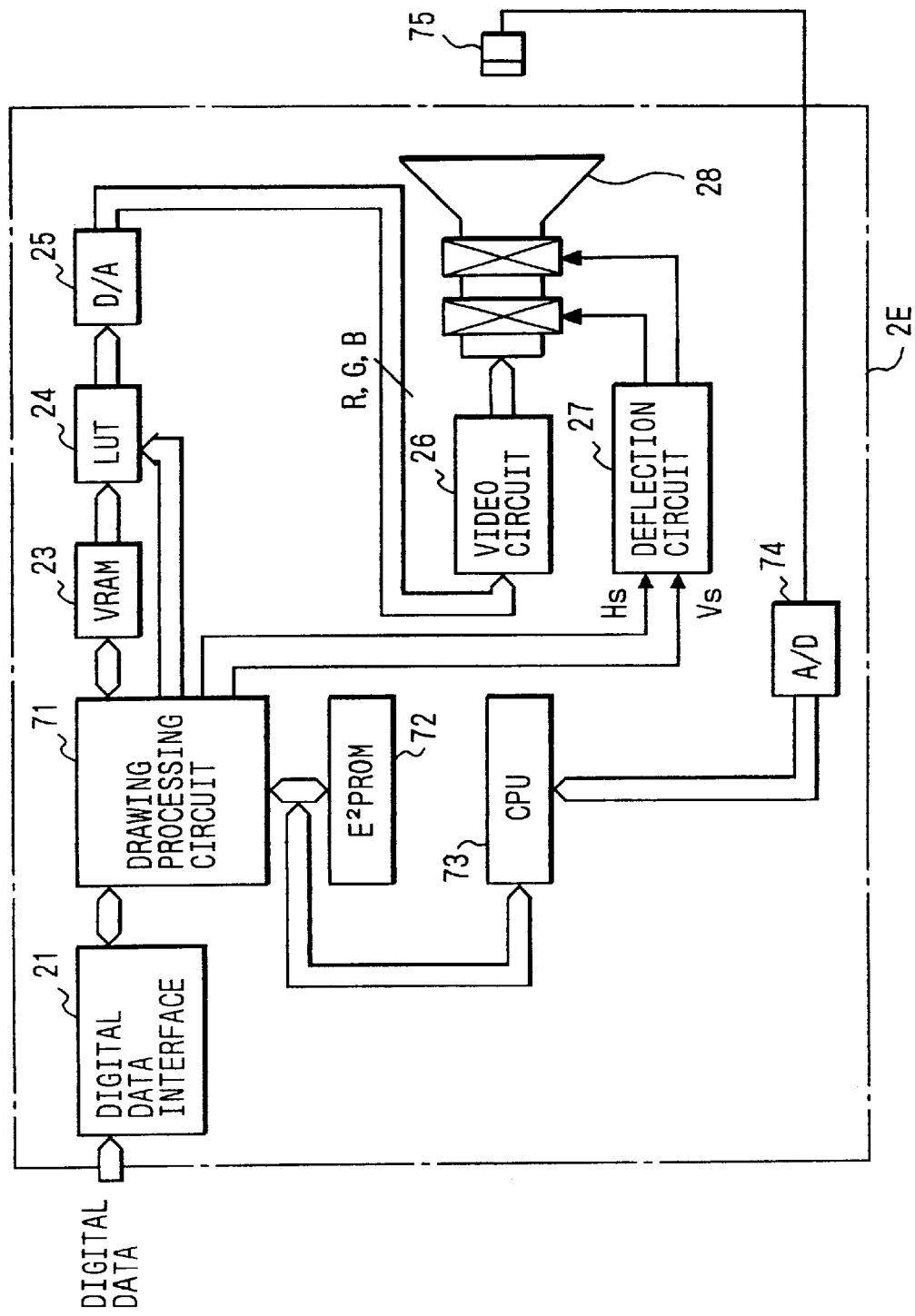
FIG. 8 is a block diagram of yet another embodiment of the invention.

FIG. 8 is a block diagram of another embodiment of the invention. In FIG. 8, a portion 2E enclosed by a dashed line is a display unit. In the portion 2E, reference numeral 71 is a drawing processing circuit different from the drawing processing circuits of the preceding embodiments; 72 is a writable read-only memory ($E^2$PROM); 73 is a CPU; 74 is an ADC; and 75 is a light-receiving unit such as a sensor or a camera. The reference numerals identical to those in FIG. 1 denote the same or corresponding components.

This embodiment of FIG. 8 works as follows: the drawing process takes place in exactly the same manner as in the embodiment of FIG. 1. The display unit 2E receives a video drawing command from the computer 1A (FIG. 1) via the digital data interface 21. The circuitry comprising the drawing processing circuit 71, VRAM 23, LUT 24 and DAC 25 provides an analog video signal based on that video drawing command in the previously described manner.

A circuit portion including the $E^2$PROM 72, CPU 73, ADC 74 and light-receiving unit 75 measures and processes various characteristics regarding the display on the display unit 2E, and retains the characteristic data thus obtained. The characteristics measured include the so-called gamma characteristic, maximum brightness, minimum brightness, and color temperature of the CDT 28. In measuring these characteristics, the CPU 73 controls the drawing processing circuit 71 so that the CDT 28 will display all-white screens, individual RGB monochromatic screens, medium-brightness screens, low-brightness screens, etc. With these screens displayed, the status of the tube surface on the CDT 28 is measured by the light-receiving unit 75. The measurements taken are converted to digital format by the ADC 74 before being input to the CPU 73. The CPU 73 performs suitable operations based on the level of the analog video signal output by the DAC 25 and according to the measurements received. The results of the operations are written to the $E^2$PROM 72 as the display characteristic data regarding the display unit 2E. The data thus held in the $E^2$PROM 72 are transmitted to the computer 1A via the digital data interface 21 when the computer 1A requests it or when power is applied to the display unit 2E. The transmitted characteristic data is read into the computer 1A illustratively for use in a socalled color matching operation, i.e., the matching, in terms of color, of the picture on the display unit 2E illustratively with the print material to be output on a printer. Any chromatic deviation from the print material is corrected on the display unit 2E using correction designation data sent from the computer 1A. In the display unit 2E, the drawing processing circuit 71 and the CPU 73 correct the analog video signal to be output to the DAC 25. This allows the picture to be displayed in the coloration matching illustratively that of the print material.

FIG. 8A depicts a preferred embodiment of drawing processing circuit 71. The reference numerals identical with FIG. 1A represent the same or corresponding components. Bus control circuit 710 applies the display characteristic data held in $E^2$PROM 72 to digital data interface 21 in response to requests originating in computer 1A or when power is applied to display unit 2E.

Figure 9:
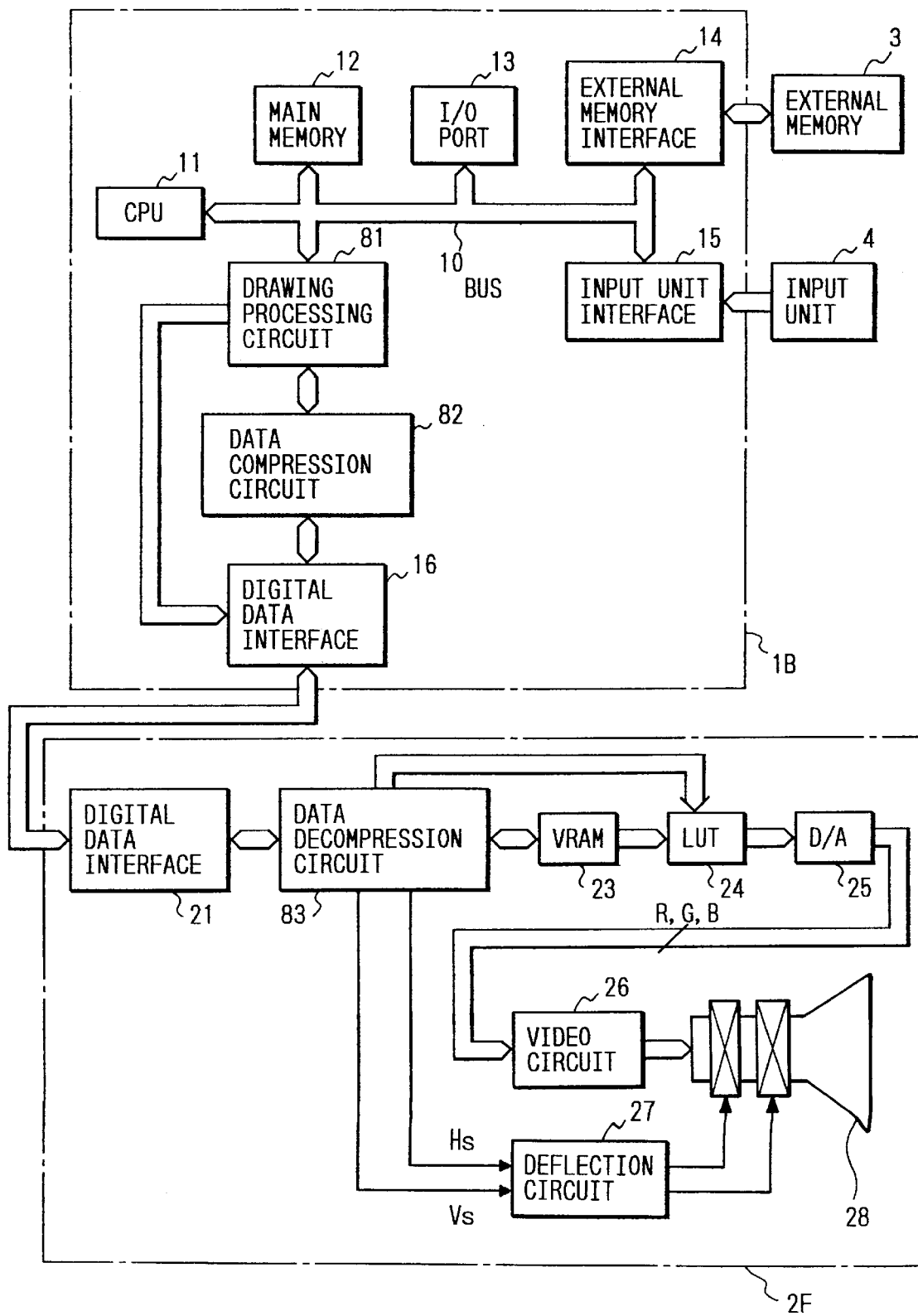
FIG. 9 is a block diagram of another embodiment of the invention.

FIG. 9 is a block diagram of another embodiment of the invention. In FIG. 9, a portion 1B enclosed by a dashed line is a computer proper. In the portion 1B, reference numeral 81 is a drawing processing circuit, and 82 is a data compression circuit. The other portion 2F also enclosed by a dashed line in FIG. 9 is a display unit. In the portion 2F, reference numeral 83 is a data decompression circuit. The reference numerals identical to those in FIG. 1 denote the same or corresponding components.

This embodiment of FIG. 9 works as follows: a CPU 11, a main memory 12, an I/O port 13, an external memory interface 14 and input unit interface 15 in the computer 1B operate in the same manner as their counterparts in commonly used computers. The CPU 11 processes various control commands and digital video data input thereto from an external memory 3 or from the input unit 15 via a bus 10. After processing, the CPU 11 supplies the drawing processing circuit 81 with a control command pertaining to video reproduction. The drawing processing circuit 81 develops the received control command into digital video data for actual video display, providing video data corresponding with the video display drawn on the CDT 28. The quantity of the digital video data can amount to as high as several million megabytes per second if used unmodified. The data compression circuit 82 thus compresses the digital video data by a factor of tens through one hundred and tens in accordance with well-known data compression arrangements, so that the data quantity becomes low enough for the data to be transferred via the digital data interface 16. The digital data interface 16 outputs the compressed digital video data to the display unit 2F. In addition to the digital video data, the drawing processing circuit 81 generates synchronizing signal information for the display unit 2F and display control data for display status control thereof. The additionally generated information and data are sent along with the digital video data from the digital data interface 16 to the display unit 2F.

The display unit 2F receives the compressed digital video data and the display control data through the digital data interface 21 and forwards what is received to the data decompression circuit 83 located downstream. The data decompression circuit 83 decompresses the compressed digital video data back to the initial digital video data for reproduction and writes the data in the VRAM 23. In addition, the data decompression circuit 83 generates horizontal and vertical synchronizing signals (Hs, Vs) based on the display control data for driving the deflection circuit 27 of the display unit 2F, and updates settings in the LUT 24 so as to vary the coloration and video signal level of the displayed picture. After being stored in the VRAM 23, the digital video data is retrieved therefrom by the LUT 24 and DAC 25 as an analog video signal. The analog video signal then passes through the video circuit 26 to drive the CDT 28 for display on the latter. In essence, this embodiment involves having the digital video data compressed on the transmitting side and decompressed on the receiving side. This permits the digital video data to be transmitted as per generally practiced interface specifications.

This embodiment may, as in the case in FIG. 5, include the switching control circuit 38 and the analog signal switching circuit 42 to receive video signals from the outside. In that case, the data decompression circuit 83 controls the analog signal switching circuit 42 to provide the same effects that are available with the embodiment of FIG. 5.

Figure 10:
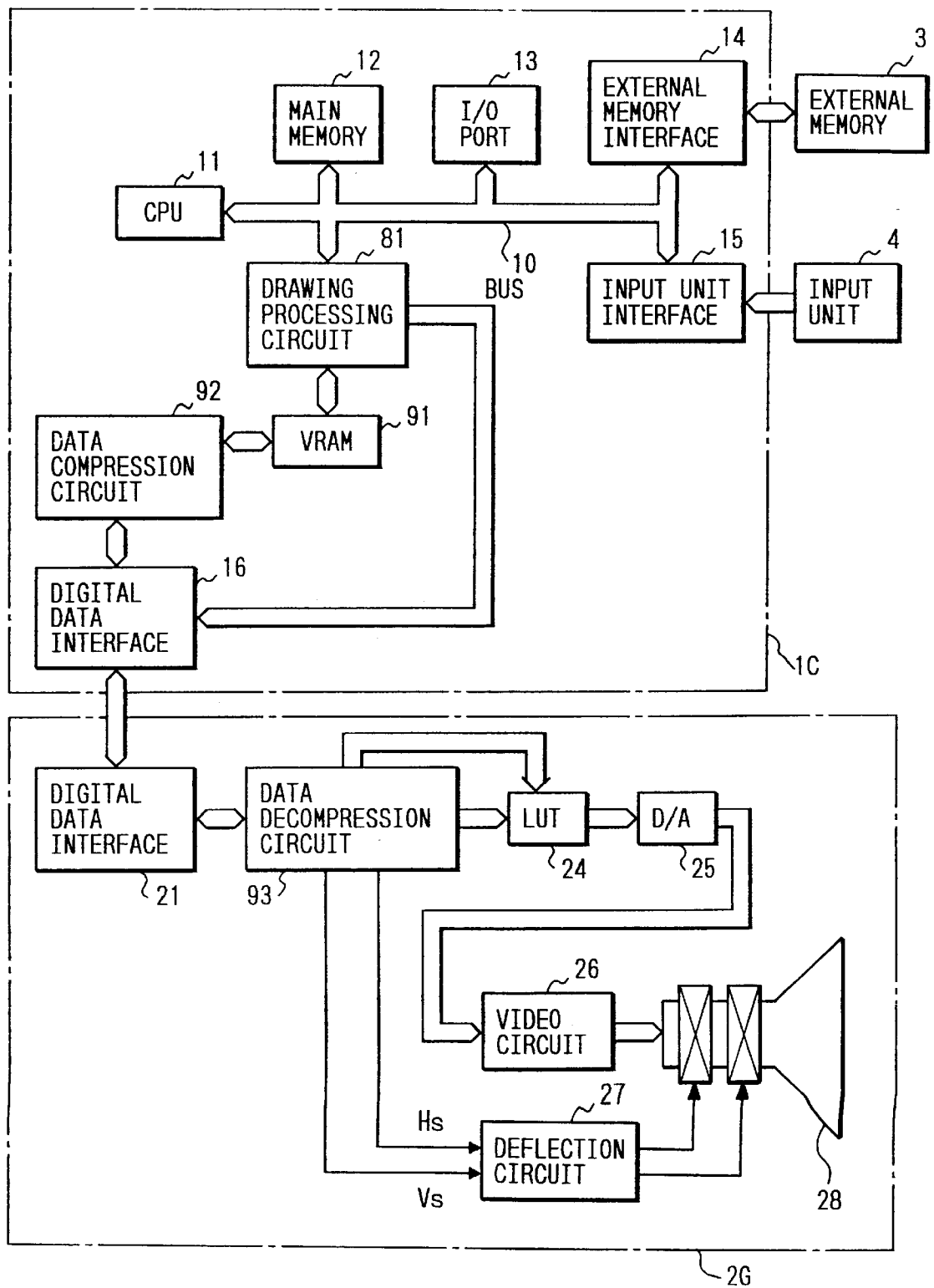
FIG. 10 is a block diagram of a further embodiment of the invention.

FIG. 10 is a block diagram of yet another embodiment of the invention. In FIG. 10, a portion 1C enclosed by a dashed line is a computer proper. In the portion 1C, reference numeral 91 is a VRAM for storing digital video data, and 92 is a data compression circuit. Those other reference numerals in the portion 1C which are identical to those in FIGS. 1 and 9 denote the same or corresponding components. The other portion 2G of FIG. 10 also enclosed by a dashed line is a display unit. In the portion 2G, reference numeral 93 is a data decompression circuit. Those other reference numerals in the portion 2G which are identical to those in FIG. 1 represent the same or corresponding components.

In this embodiment, as in the embodiment of FIG. 9, the CPU 11 generates a control command pertaining to video reproduction and sends it to the drawing processing circuit 81. Upon receipt of the control command, the drawing processing circuit 81 generates digital video data. The digital video data thus generated is placed temporarily in the VRAM 91 and later read therefrom by the data compression circuit 92 located downstream. The data compression circuit 92 compresses the retrieved digital video data down to a data quantity low enough for the data to be output through the digital data interface 16. The drawing processing circuit 81 sends to the digital data interface 16 control data regarding the display on the display unit 2G such as synchronizing signal information and display colors. Thus, the digital data interface 16 outputs the compressed digital video data and the control data for the display unit 2G.

The display unit 2G transmits the above data consecutively via the digital data interface 21 to the data decompression circuit 93. The data decompression circuit 93 decompresses the compressed digital video data back to the initial digital video data. The LUT 24 and DAC 25 process the decompressed data and provide an analog video signal to the video circuit 26. Using display unit control data, the data decompression circuit 93 also generates synchronizing signals (Hs, Vs) for the deflection circuit 27 and data for varying the settings in the LUT 24. In this manner, large quantities of digital video data are compressed for transmission over the line complying with general interface specifications, whereby the degradation of picture quality and the unwanted radiation noise associated with the transmission line are suppressed.

This embodiment may, as in the case of FIG. 5, include the switching control circuit 38 and the analog signal switching circuit 42 to receive video signals from the outside. In that case, data decompression circuit 93 controls the analog signal switching circuit 42 to provide the same effects that are available with the embodiment of FIG. 5.

Figure 11:
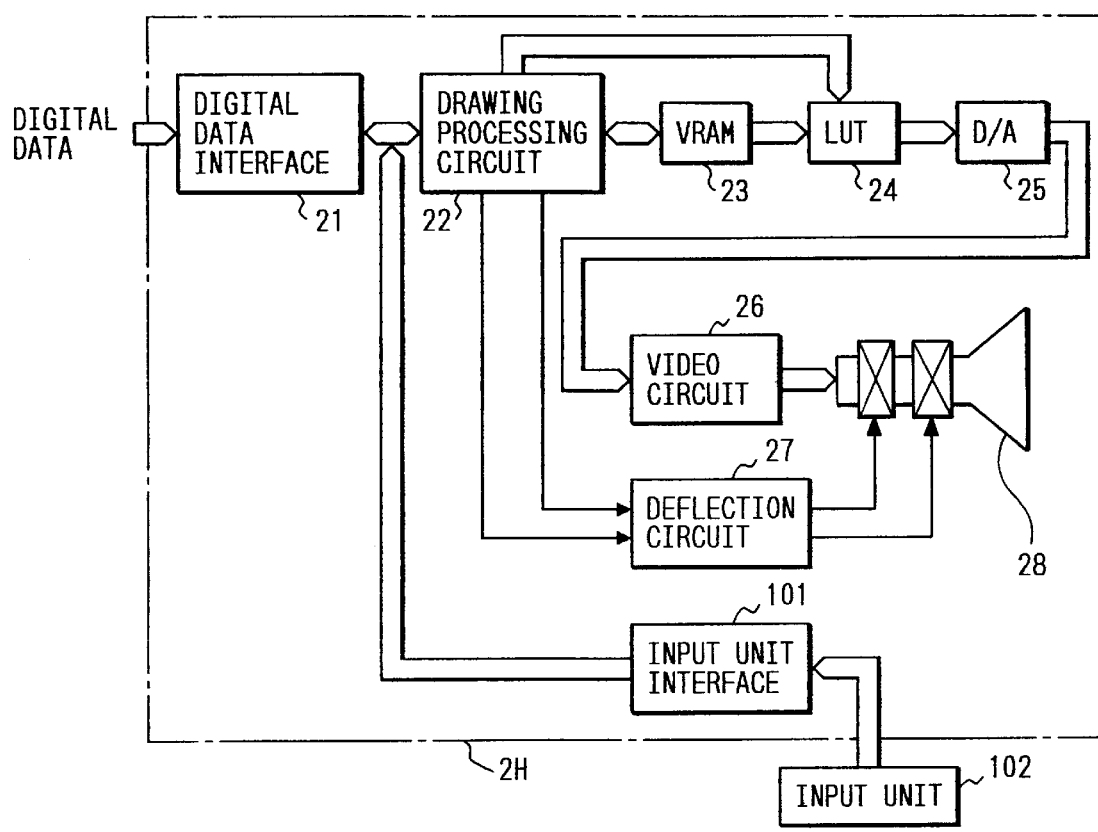
FIG. 11 is a block diagram of another embodiment of the invention.

FIG. 11 is a block diagram of another embodiment of the invention. In FIG. 11, a portion 2H enclosed by a dashed line is a display unit. In the portion 2H, reference numeral 101 is an input unit interface, and 102 is an input unit. The reference numerals identical to those in FIG. 1 denote the same or corresponding components.

The embodiment of FIG. 11 works as follows: in this embodiment, the computer 1A shown in FIG. 1 is connected to the display unit 2H. Upon receipt of digital video data from the computer 1A, the circuitry comprising the digital data interface 21, drawing processing circuit 22, VRAM 23, LUT 24 and DAC 25 generates an analog video signal and deflection signals in the same manner as with the embodiment of FIG. 1. The analog video signal and deflection signals are sent via the video circuit 26 and deflection circuit 27 to the CDT 28 to provide video display thereon. The display unit 2H of FIG. 11 is connected to the input unit 102 such as a keyboard, a mouse, a touch panel or a pen tablet, etc. Information from the input unit 102 is received by the input unit interface 101. The input unit interface 101 converts the received information to an appropriate format and sends the information as a control command to the computer 1A via the digital data interface 21. The computer 1A processes the received control command and generates accordingly information to be displayed on the display unit 2H. The information thus generated is output as digital video data through the digital data interface 16 of the computer 1A. On receiving the data, the display unit 2H updates its video display.

This embodiment has the input unit 102 added to the display unit 2H. This makes it possible, with the display unit 2H located away from the computer 1A, for information to be acquired very close to the display unit 2H. Because the video signal is mostly free of transmission losses, pictures of high quality are displayed.

Figure 12:
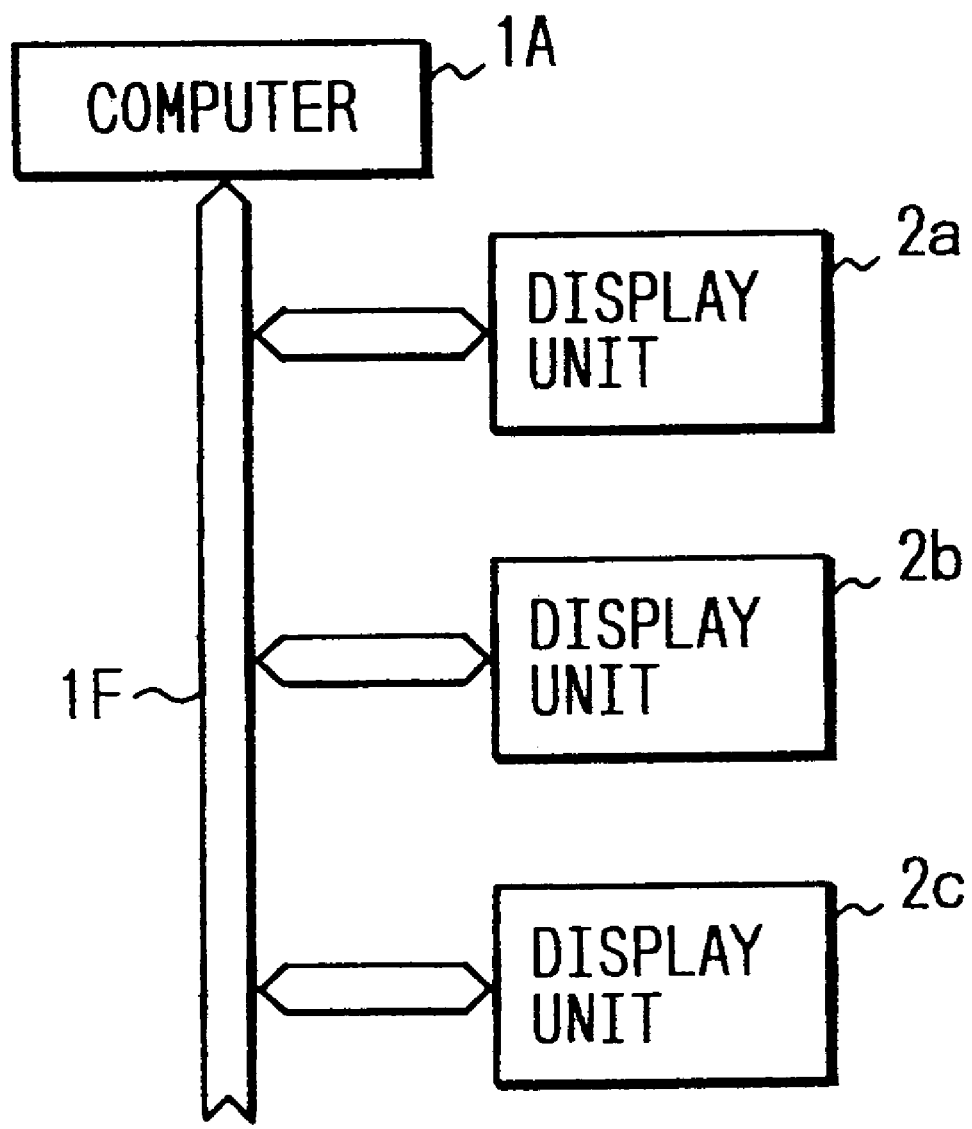
FIG. 12 is a block diagram of still another embodiment of the invention.

FIG. 12 is a block diagram of another embodiment of the invention. This embodiment includes a computer 1A, display units 2a, 2b and 2c, and a digital data interface 1F. The computer 1A is the same as that of FIG. 1, and each of the display units is the same in constitution as that of one of the display units shown in FIG. 1, 3, 4, 5, 8 or 11. In this embodiment, the display units 2a, 2b and 2c are connected to the digital data interface 1F. A video drawing command sent from the computer 1A to the digital data interface 1F is input to each of the display units 2a, 2b and 2c for individual video display thereon. Suppose that before transmission of a video drawing command, the computer 1A outputs a selection command designating which of the display units is to receive the video drawing command. In that case, the interfaces of the respective display units interpret the selection command, and the designated display unit admits the video drawing command sent in following the selection command. If the selection command designates all display units 2a, 2b and 2c connected to the digital data interface 1F, all display units display the same picture simultaneously. If the selection command designates the display unit 2a, the video display on that display unit alone is updated. As described, this embodiment allows any or all of a plurality of display units connected to the digital data interface 1F to display pictures individually or simultaneously, thereby expanding the scope of video display availability.

The invention may be embodied in other specific forms without departing from the spirit or essential characteristic thereof. The present embodiment is therefore to be considered in all respects as illustrative and not restrictive, the scope of the invention being indicated by the appended claims rather than by the foregoing description, and all changes which come within the meaning and range of equivalency of the claims are therefor intended to be embraced therein.

We claim:

1. A digital video display system comprising:

a digital data output unit, including a CPU for generating and outputting a video drawing command for video display, and first digital interface means for transmitting the video drawing command;

a display unit, including second digital interface means for receiving the video drawing command transmitted from said first digital interface means; drawing processing means for generating digital video data and a synchronizing signal from the received video drawing command; video memory means for temporarily storing the digital video data and for outputting the digital video data; digital-analog conversion means coupled to said video memory means for converting the digital video data output of said video memory means into an analog video signal; and display means for displaying pictures based both on the analog video signal and on the synchronizing signal.

2. A digital video display system comprising:

a digital data output unit, including a CPU for generating and outputting a video drawing command for video display and an audio processing command for audio reproduction, and first digital interface means for transmitting the video drawing command and the audio processing command;

a display unit, including second digital interface means for receiving the video drawing command and the audio processing command transmitted from said first digital interface means; drawing processing means for generating digital video signal data and a synchronizing signal from the received video drawing command; video memory means for temporarily storing the digital video data and for later outputting the digital video data; first digital-analog conversion means coupled to said video memory means for converting the digital video data output of said video memory means into an analog video signal; display means for displaying pictures based both on the analog video signal and on the synchronizing signal; audio processing means for generating digital audio data in accordance with the received audio processing command; audio memory means for temporarily storing the digital audio data and for outputting the digital audio data; second digital-analog conversion means for converting the digital audio data output from said audio memory means into an analog audio signal; and audio output means for outputting audio based on the analog audio signal.

3. A digital video display system comprising:

a digital data output unit, including a CPU for generating and outputting a video drawing command for video display and a switching control command for switching control, and first digital interface means for transmitting the video drawing command and the switching control command;

a display unit including second digital interface means for receiving the video drawing command and the switching control command transmitted from said first digital interface means; first input means for receiving an external analog video signal; preprocessing means for clamping the received analog video signal and for extracting a synchronizing signal from the received analog video signal; clock generation means for generating and outputting a clock signal in phase synchronization with the extracted synchronizing signal; analog-digital conversion means for converting the clamped analog video signal into digital video data using the clock signal output from said clock generating means as a sampling clock signal; temporary storage means for temporarily storing the digital video data; second input means for receiving an external video processing command; switching control means for outputting a switching command based either on the switching control command received by said second digital interface means or on the received video processing command input; drawing processing means for onverting the received video drawing command into digital video data and a synchronizing signal and for selectively outputting either the converted digital video data or the temporarily stored digital video data in accordance with the switching command; video memory means for temporarily storing the digital video data output from said drawing processing means and for later outputting said digital video data; digital-analog conversion means coupled to said video memory means for converting the digital video data output of said video memory means into an analog video signal; and display means for displaying pictures based both on the analog video signal and on the generated synchronizing signal from said drawing processing means.

4. A digital video display system comprising:

a digital data output unit, including a CPU for generating and outputting a video drawing command for video display and a switching control command for switching control, and first digital interface means for transmitting the video drawing command and the switching control command;

a display unit, including second digital interface means for receiving the video drawing command and the switching control command transmitted from said first digital interface means; first input means for receiving an external video processing command; switching control means for outputting a switching command based either on the switching control command or on the video processing command; second input means for receiving an external synchronizing signal; drawing processing means for converting the video drawing command into digital video data and to a second synchronizing signal in accordance with the switching command and in either synchronism or asynchronism with the received synchronizing signal, said drawing processing means further outputting a selection signal in accordance with the switching command; video memory means for temporarily storing the digital video data and for outputting said digital video data; digital-analog conversion means coupled to said video memory means for converting the digital video data output of said video memory means into an analog video signal; selection means for selecting and outputting one of two analog video signals in accordance with the second selection signal, one of the two analog video signals being the external analog video signal along with the external synchronizing signal, the other of the two analog video signals being the analog video signal output by said digital-analog conversion means; and display means for displaying pictures based both on the analog video signal output by said selection means and on the synchronizing signal generated by said drawing processing means.

5. A digital video display system comprising:

a digital data output unit, including a CPU for generating and outputting a video drawing command for video display, and first digital interface means for transmitting the video drawing command;

a display unit, including second digital interface means for receiving the video drawing command transmitted from said first digital interface means; drawing processing means for generating digital video data and a synchronizing signal from the received video drawing command; video memory means for temporarily storing the digital video data and for outputting the digital video data; digital-analog conversion means coupled to said video memory means for converting the digital video data output of said video memory means into an analog video signal; display means for displaying pictures based both on the analog video signal and on the synchronizing signal; first input means adapted for connection to an external sensor for receipt of a detection signal; analog-digital conversion means connected to said first input means for detecting and outputting the display status of said display means, said analog-digital conversion means converting the detection signal into digital detection data; operation means for generating characteristic data about said display unit on the basis of the digital detection data; memory means for temporarily storing the characteristic data and for outputting the characteristic data; and means for transmitting the characteristic data output from said memory means to said digital data output unit via said drawing processing means and said second digital interface means.

6. A digital video display system comprising:

a digital data output unit, including a CPU for generating and outputting a video display command; drawing processing means for generating digital video data and synchronizing signal data based on the video display command; data compression means for compressing the digital video data to provide compressed video data; and first digital interface means for transmitting both the compressed video data and the synchronizing signal data;

a display unit including second digital interface means for receiving the compressed video data and the synchronizing signal data transmitted from said first digital interface means; data decompression means for decompressing the received compressed video data to provide the initial digital video data, said data decompression means further generating a synchronizing signal from the received synchronizing signal data; video memory means for temporarily storing the digital video data provided by said data decompression means and for outputting the digital video data; digital-analog conversion means coupled to said video memory means for converting the digital video data output of said video memory means into an analog video signal; and display means for displaying pictures based on the analog video signal and the synchronizing signal generated by said data decompression means.

7. A digital video display system comprising:

a digital data output unit, including a CPU for generating and outputting a video display command; drawing processing means for generating digital video data and synchronizing signal data based on the video display data; video memory means for temporarily storing the digital video data and for outputting the digital video data; data compression means for compressing the digital video data output from said video memory means to provide compressed video data; and first digital interface means for transmitting both the compressed video data and the synchronizing signal data;

a display unit, including second digital interface means for receiving the compressed video data and the synchronizing signal data transmitted from said first digital interface means; data decompression means for decompressing the received compressed video data to provide the initial digital video data, said data decompression means further generating a synchronizing signal from the received synchronizing signal data; digital-analog conversion means coupled to said data decompression means for converting the digital video data output of said data decompression means into an analog video signal; and display means for displaying pictures based both on the analog video signal and on the generated synchronizing signal.

8. A digital video display system comprising:

a digital data output unit, including a CPU for generating and outputting a video display command and a switching control command; drawing processing means for generating digital video data and synchronizing signal data based on the video display command and the switching control command; data compression means coupled to said drawing processing means for compressing the digital video data to provide compressed video data; and first digital interface means for transmitting the compressed video data, the synchronizing signal data, and the switching control command;

a display unit, including second digital interface means for receiving the compressed video data, the synchronizing signal data, and the switching control command transmitted from the first digital interface means; first input means for receiving an external video processing command; switching control means for outputting a switching command based on either one of two commands, one of said two commands being the received switching control command, the other of said two commands being the received external video processing command; second input means for receiving a second synchronizing signal; data decompression means for decompressing the received compressed video data in accordance with the switching command output from said switching control means in either synchronism or asynchronism with the second synchronizing signal to provide the initial digital video data, said data decompression means further generating a third synchronizing signal from the synchronizing signal data received by said second digital interface means and outputting a selection signal in accordance with the switching command output from said switching control means; video memory means for temporarily storing the digital video data output from said data decompression means and for outputting the digital video data; digital-analog conversion means coupled to said video memory means for converting the digital video data output of said video memory means into an analog video signal; third input means for receiving an external analog video signal; selection means for selecting and outputting one of two analog video signals in accordance with the selection signal, one of said two analog video signals being the received external analog video signal along with the second synchronizing signal, the other of said two analog video signals being the analog video signal output from said digital-analog conversion means; and display means for displaying pictures based both on the analog video signal output from said selection means and on the third synchronizing signal.

9. A digital video display unit comprising input means adapted to be coupled to a digital data output unit for receiving therefrom a digital video drawing command for a video display, a video processor coupled to said input means for generating an analog video signal and synchronizing signals from the received digital video drawing command, a video circuit coupled to said video processor and responsive to the analog video signal for providing a video display signal, a driving circuit coupled to said video processor and responsive to the synchronizing signals for providing video deflection signals, and output means coupled to said video circuit and said driving circuit and adapted for connection to a video display device for applying the video display signal and the deflection signals to the video display device to cause on the video display device a video display in accordance with the digital video command.

10. A digital video display system comprising:

a digital data output unit for providing a digital video drawing command for a video display; and a display unit, including input means coupled to said digital data output unit for receiving the digital video drawing command, a video processor coupled to said input means for generating an analog video signal and synchronizing signals from the received digital video drawing command, a video circuit coupled to said video processor and responsive to the analog video signal for providing a video display signal, a driving circuit coupled to said video processor and responsive to the synchronizing signals for providing video deflection signals, and output means coupled to said video circuit and said driving circuit and adapted for connection to a video display device for applying the video display signal and the deflection signals to the video display device to cause on the video display device a video display in accordance with the digital video drawing command.

11. A digital video display unit comprising:

an interface circuit adapted to be coupled to a digital data output unit for receipt therefrom of a digital video signal;

processing means for converting the digital video signal to an analog video signal and a synchronizing signal;

a video circuit for receiving the analog video signal;

a driving circuit for receiving the synchronizing signal; and a display device for displaying a video image in response to outputs from said video circuit and said driving circuit in accordance with the digital video signal.

12. A digital video display system comprising:

a digital data output unit including a processor for generating a digital video signal, and a first interface circuit for transmitting the digital video signal; and a display unit including a second interface circuit for receiving the digital video signal from said digital data output unit, processing means for converting the digital video signal to an analog video signal and a synchronizing signal, a video circuit for receiving the analog video signal, a driving circuit for receiving the synchronizing signal, and a display device for displaying a video image in response to outputs from said video circuit and said driving circuit in accordance with the digital video signals.

13. A digital video display system as claimed in claim 1, wherein said digital-analog conversion means comprises a look-up table for translating the digital video data output of said video memory means into translated digital video data, and a digital-analog converter for converting the translated digital video data into the analog video signal.

14. A video display system as claimed in claim 2, wherein said first digital-analog conversion means comprises a look-up table for translating the digital video data output of said video memory means into translated digital video data, and a digital-analog converter for converting the translated digital video data into the analog video signal.

15. A digital video display system as claimed in claim 3, wherein said digital-analog conversion means comprises a look-up table for translating the digital video data output of said video memory means into translated digital video data, and a digital-analog converter for converting the translated digital video data into the analog video signal.

16. A digital video display system as claimed in claim 4, wherein said digital-analog conversion means comprises a look-up table for translating the digital video data output of said video memory means into translated digital video data, and a digital-analog converter for converting the translated digital video data into the analog video signal.

17. A digital video display system as claimed in claim 5, wherein said digital-analog conversion means comprises a look-up table for translating the digital video data output of said video memory means into translated digital video data, and a digital-analog converter for converting the translated digital video data into the analog video signal.

18. A digital video display system as claimed in claim 6, wherein said digital-analog conversion means comprises a look-up table for translating the digital video data output of said video memory means into translated digital video data, and a digital-analog converter for converting the translated digital video data into the analog video signal.

19. A digital video display system as claimed in claim 7, wherein said digital-analog conversion means comprises a look-up table for translating the digital video data output of said data decompression means into translated digital video data, and a digital-analog converter for converting the translated digital video data into the analog video signal.

20. A digital video display system as claimed in claim 8, wherein said digital-analog conversion means comprises a look-up table for translating the digital video data output of said video memory means into translated digital video data, and a digital-analog converter for converting the translated digital video data into the analog video signal.

21. A display unit, comprising:

a digital data interface adapted to be coupled to digital equipment for receipt of digital data therefrom;

a drawing processing circuit for generating digital video data and synchronizing signals in response to received digital data;

a digital-analog converter for converting the digital video data from the drawing processing circuit into analog video signals; and a display device for displaying video images in response to the analog video signals and the synchronizing signals.

22. A display unit, comprising:

a digital data interface adapted to be coupled to digital equipment for receipt of digital data therefrom;

a drawing processing circuit for generating digital video data and synchronizing signals in response to received digital data;

a first digital-analog converter for converting the digital video data from said drawing processing circuit into analog video signals;

a display device for displaying video images in response to the analog video signals and the synchronizing signals;

an audio processing circuit for generating a digital audio signal in response to received digital data;

a second digital-analog converter for converting the digital audio signal from said audio processing circuit into analog audio signals; and a speaker for providing an audio output in response to the analog audio signals.

23. A display unit, comprising:

a digital data interface adapted to be coupled to digital equipment for receipt of digital data therefrom and transmission of digital data thereto;

a drawing processing circuit for generating digital video data and synchronizing signals in response to received digital data;

a digital-analog converter for converting the digital video data from said drawing processing circuit into analog video signals;

a display device for displaying video images in response to the analog video signals and the synchronizing signals;

a microphone for providing analog audio signals;

an analog-digital converter for converting the analog audio signals from said microphone into digital audio signals; and an audio processing circuit for converting the digital audio signals into digital audio data and applying the digital audio data to said digital data interface for transmission of the digital audio data to the digital equipment.

24. A display unit, comprising:

a first interface for receiving a first analog video signal;

an analog-digital converter for converting the first analog video signal to a first digital video signal;

a memory for storing the first digital video signal;

a second interface adapted to be coupled to digital equipment for receiving digital data therefrom;

a drawing processing circuit for generating a second digital video signal in response to the received digital data;

a combining circuit for combining the first and second digital video signal signals to provide a combined digital video signal;

a digital-analog converter for converting the combined digital video signal to a second analog video signal; and a display device for displaying video images in response to the second analog video signal.

25. A display unit as claimed in claim 24, wherein said combining circuit comprises a switching circuit.

26. A display unit, comprising:

a first interface for receiving a first analog video signal, including a first synchronizing signal;

a second interface adapted to be coupled to digital equipment for receiving digital data therefrom;

a drawing processing circuit connected to said second interface for generating digital video data and a second synchronizing signal in response to the received digital data;

a digital-analog converter for converting the digital video signal from said drawing processing circuit into a second analog video signal;

a switching circuit having a first input connected to the first interface, to receive the first analog video signal and the first synchronizing signal, and a second input connected to the digital-analog converter, to receive the second analog video signal, and connected to the drawing processing circuit, to receive the second synchronizing signal, said switching circuit having an output and being capable of assuming alternatively a first state in which said first input is coupled to said output and a second state in which said second input is coupled to said output; and a display device connected to said switching circuit output for displaying video images in response to the first and second analog video signals and the first and second synchronizing signals.

27. A display unit, comprising:

a digital interface circuit adapted to be coupled to digital equipment for receipt of compressed digital data therefrom;

a decompression circuit for decompressing the received compressed digital data to provide a digital video signal and a synchronizing signal;

a digital-analog converter for converting the digital video signal from the decompression circuit into an analog video signal; and a display device for displaying video images in response to the analog video signal and the synchronizing signal.

* * * * *